United States Patent [19]

Sarser

[11] 4,454,998

[45] Jun. 19, 1984

[54] TAPE WINDING GUIDE AND CENTERING APPARATUS AND METHOD

[75] Inventor: David Sarser, Northport, N.Y.

[73] Assignee: King Instrument Corporation, Westboro, Mass.

[21] Appl. No.: 295,992

[22] Filed: Aug. 25, 1981

[51] Int. Cl.³ .................... B65H 19/00; B65H 21/00; B65H 27/00

[52] U.S. Cl. .................... 242/68.1; 242/76; 242/71.8; 242/71.9; 242/68.4

[58] Field of Search .................... 242/68.1, 76, 71.8, 242/71.9, 68.4, 74, 67.3 R, 58.4, 77

[56] References Cited

U.S. PATENT DOCUMENTS

| | | | |
|---|---|---|---|
| 2,392,492 | 1/1946 | Morgan | 242/71.8 X |
| 2,529,501 | 11/1950 | Johnston | 242/71.8 |
| 3,265,320 | 8/1966 | Johnson | 242/76 |
| 3,795,370 | 3/1974 | Dean | 242/76 |

OTHER PUBLICATIONS

IBM Technical Disclosure Bulletin, vol. 5, No. 1, Jun. 1962, E. L. Dambroski, Flexible Tape Reel.

Primary Examiner—Stuart S. Levy
Assistant Examiner—Lloyd D. Doigan
Attorney, Agent, or Firm—Schiller & Pandiscio

[57] ABSTRACT

A tape winding guide and centering apparatus engages the outside face of each of the flanges of the reel being wound by one of a pair of variably spaced apart, coaxial, similarly sized confronting annuli which rotate with the reel during the winding operation. The variable spacing of the annuli is controlled to distort the reel to close the peripheries of the flanges to a predetermined spacing. An adjustable stop is also provided to position the reel hub to a predefined axial location relative to the distorted flange rims.

12 Claims, 6 Drawing Figures

TAPE WINDING GUIDE AND CENTERING APPARATUS AND METHOD

This invention relates to tape winding machines, and more particularly to tape winding machines in which the tape is wound into a reel having one or more transparent flanges.

Tape winding machines are well known and are used in a number of applications as, for example, the manufacture of video or audio cassettes and the like. In the typical cassette manufacturing operation, a pair of reels or hubs are fabricated as a unit joined together by a length of leader. In the tape winding operation, the leader joining a pair of hubs is cut and the leader attached to one of the hubs is spliced to a supply of blank or prerecorded tape. The leader and supply tape are then wound on this hub until a predetermined amount of tape has been so wound, after which the supply tape is cut and spliced to the leader on the other hub.

In loading video cassettes, the tape is wound onto one of a pair of plastic reels, which are then assembled into a cassette. In order that the quantity of tape on a reel may be rapidly determined visually, one of the flanges or faces of the reel is commonly made of transparent plastic. The transparent flange not only allows a rapid inspection of the quantity of tape on the reel, but allows a qualitative judgment of the winding operation to be made as well.

A commonly encountered cosmetic defect is a nonuniform super-positioning of successive wraps of the tape, giving the side surface of the wound reel a rippled appearance. Visual inspection of a loaded reel for such rippling is common, as such an appearance may be indicative of warped reels or unevenly cut tape. However, it has been found that a rippled appearance may also be due to such factors as accumulation of electric charge on tape or reel during the winding operation, varying lubricity of the tape, and small variations in tape tension due to variations in the speed of the supply reel. These last-named factors are of little consequence in cassette performance, and accordingly, it is desirable to reduce the rippled appearance of wound reels due to these factors in order to minimize the rejection of otherwise satisfactory cassettes.

Various approaches to improving the uniformity of winding have been attempted. These include the use of packing rollers or belts adjustably extending between the flanges of the reel and guide rolls located immediately adjacent the periphery of the reel. Neither approach has proved completely successful. Packing rollers and belts have been found to cause too tight a wind as well as potentially damaging the surface of the tape. A tight wind is not desired since the removal of air from between the turns of tape makes it difficult for the wound package to accommodate itself to changes in temperature and humidity. Clearly, damaging the surface of the tape is also unacceptable. The alternative use of a guide roll located in a fixed position near the periphery of the reel is not acceptable in practice since the wrap angle of the tape over the roll will vary substantially with the amount of tape wound onto a reel, approaching 90 degrees for a full reel. As a consequence of this, the tension on the tape increases significantly as winding progresses.

Accordingly, it is an object of the present invention to provide guide means for a tape winding machine that will improve the alignment of successive layers of tape despite static buildup or tape lubricity changes. It is a further object of the present invention to provide guide means for uniformly winding tape which contacts the tape solely by its edges, thereby minimizing damage to the tape surface. Additionally, it is an object of the present invention to provide such a tape guide means which neither greatly varies the tension on the tape during the winding process nor too tightly packs the tape.

These and other objects are met in the present invention of a tape winding guide and centering method in which the peripheries of the flanges of the reel are distorted toward one another to act as a tape guide, delimiting the sideways motion of the tape, and in which further the hub of the reel may be axially displaced relative to the flange rims, centering the wound tape between the flanges. In the preferred embodiment of the apparatus, the outside face of each of the flanges of the reel being wound is engaged by one of a pair of variably spaced apart coaxial, similarly sized, confronting annular ridges, mounted so as to rotate with the reel during the winding operation. The variable spacing of the annular ridges may be controlled to distort the reel such that the peripheries of the flanges close to a predetermined spacing. An adjustable stop is also provided to position the reel hub to a predefined axial location relative to the distorted flange rims.

As the tape is only contacted on its edges as it enters the reel, the tension on the tape is not appreciably changed. Consequently, this method of guiding the tape does not lead to a more tightly packed reel. Clearly, as neither surface of the tape is contacted by the guide means, surface damage will not result. While the guide means is at the periphery of the reel, it is not at a fixed point. Consequently, the wrap angle at the guiding means never becomes large. The changing tape tension caused by friction between the tape and the reel flanges is minimal and sensibly constant throughout the winding operation.

Other objects of the invention will in part be obvious and will in part appear hereinafter. The invention accordingly comprises the apparatus possessing the construction, combination of elements and arrangement of parts, and the method involving the several steps and the relation and order of one or more of such steps with respect to each of the others which are exemplified in the following detailed disclosure, and the scope of the application all of which will be indicated in the claims.

For a fuller understanding of the nature and objects of the present invention, reference should be had to the following detailed description taken in connection with the accompanying drawings wherein.

In the various views, like index numbers refer to like members.

Figure 1:
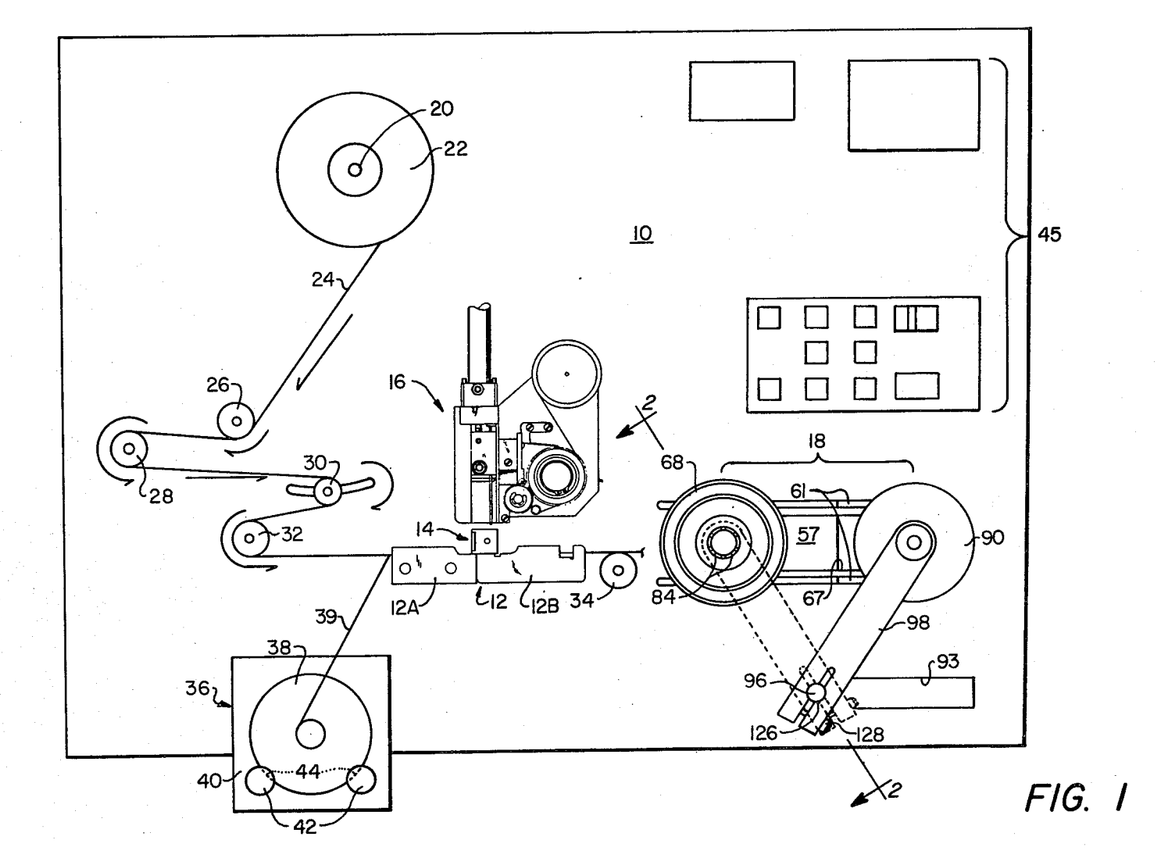
FIG. 1. is a front view of a tape winding machine with a winding station incorporating a preferred embodiment of the present invention.

Referring now to FIG. 1, a front view of a tape winding machine configured to load video cassette reels is shown with the tape winding guide and centering device which comprises the preferred form of the present invention. Such a machine includes a faceplate 10 which serves as a support for a number of means including a splicing block assembly 12, knife mechanism 14, splicing tape dispenser-applicator 16, and tape takeup assembly 18.

The splicing block assembly 12, knife mechanism 14, and splicing tape dispenser-applicator 16 are substantially the same as the corresponding mechanisms disclosed in U.S. Pat. Nos. 4,061,286 and 3,753,835. Accordingly, the splicing block assembly, knife mechanism, and splicing tape dispenser-applicator are described hereinafter only to the extent believed necessary to understand and appreciate the present invention.

Extending through faceplate 10 is a rotatable supply reel shaft 20 for supporting a reel 22 containing a supply of magnetic tape 24. A pair of idler wheels 26 and 28 are mounted to baseplate 10 via rotatable shafts and serve to direct tape 20 to tension idler 30. The latter is mounted on a shaft which projects through an elongated slot in faceplate 10 and is adapted to move laterally lengthwise of the slot according to the tension on tape 24. Means (not shown) biases the shaft of roller 30 toward the right hand end of the slot. Supply tape 24 passes from idler 30 around wheel 32 and over idler wheel 34 which are also mounted on rotatable shafts affixed to faceplate 10. Idler wheels 32 and 34 serve to direct tape 20 in a straight line through guide means 13 (indicated in FIG. 3) cut into the top surface of splicing block assembly 12. Typically the tape guide means is a groove in the upper surface of the moveable and stationary members 12A and 12B of the splicing block assembly. From idler wheel 34, tape 24 finally passes on to a first cassette tape reel (not shown in FIG. 1 in order to expose the underlying mechanism) held in tape takeup assembly 18.

Also mounted to faceplate 10 is holder 36 for supporting a second cassette tape reel 38. Holder 36 comprises a plate 40 which is affixed to faceplate 10 and a pair of rods 42 which are formed integral with and project from plate 40. Rods 42 are slotted intermediate their ends so as to form oppositely inclined surfaces 44 on which reel 38 rests. Reel 38 is the second of the pair of reels being jointly loaded, as will be described more fully hereinafter. During the splicing and supply tape loading cycle, a leader 39 attached to reel 38 is held captive to splicing block assembly 12.

Also typically incorporated into and supported by faceplate 10 are various controls, indicators, and counters, generally indicated by the numeral 45, used in controlling and monitoring the splicing and winding operation.

Figure 2:
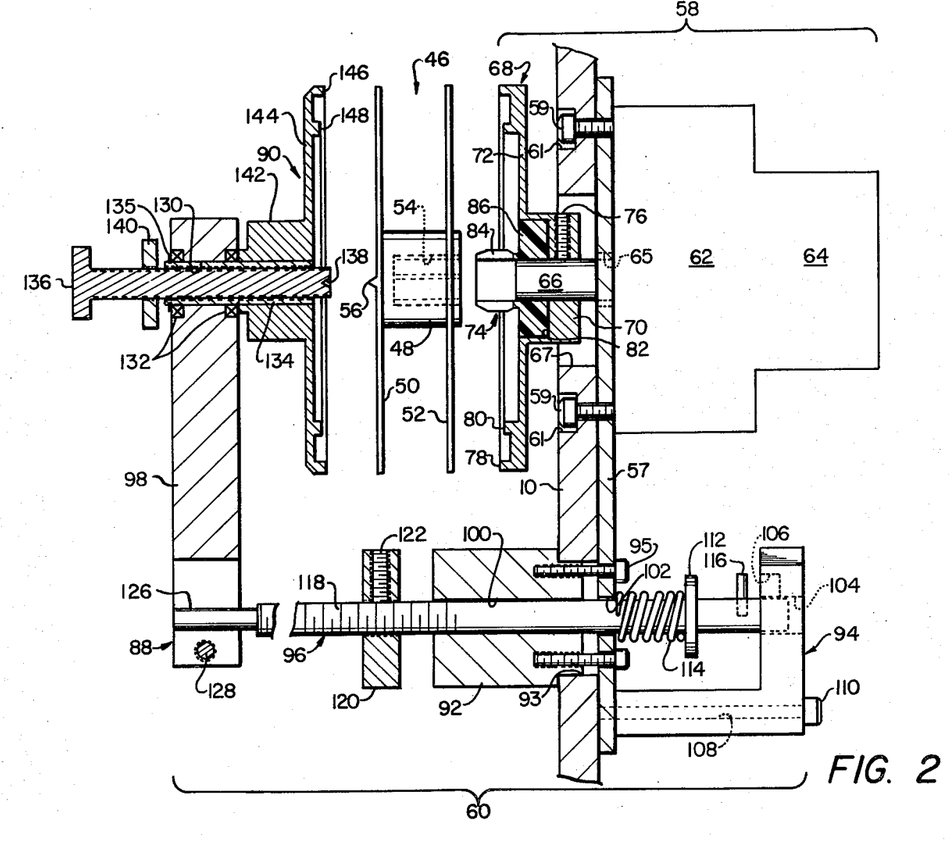
FIG. 2 is an exploded partial section of the winding station taken along the line 2—2 of FIG. 1.

Turning to FIG. 2, there may be seen a sectional view of tape takeup assembly 18, together with an edge-on view of a reel 46 with which the assembly is designed to be used. To better understand the interrelationship of parts of tape takeup assembly 18 and reel 46, the reel will be described first. Reel 46 comprises a central cylindrical hub 48 on which are affixed a pair of spaced-apart concentric circular flanges 50 and 52. For clarity, flange 50 will be hereinafter referred to as the front flange and flange 52, as the rear flange. In the typical video cassette reel, front flange 50 is of thin, transparent plastic, and is attached to the end of hub 48. Rear flange 52 is of thicker, typically opaque or translucent material, and is inset from the opposite end of hub 48 to allow the hub to project a short distance so that it may be used as a locating and bearing surface in the assembled cassette. Both flanges 50 and 52 are typically of a resiliently distortable material, although it will be appreciated that rear flange 52, because of its somewhat heavier construction, is the harder to distort of the two. An axial recess 54 is provided in the end of hub 48 nearest rear flange 52. Recess 54 is of hollow cylindrical form, and is provided with a plurality of ribs which may be engaged by a splined driving spindle. The center of the end of hub 48 to which front flange 50 is mounted is provided with a small round and tapered centering pin 56.

Two sizes of tape reel are commonly employed in video tape cassettes, having nominal diameters of 3.5 inches (90 mm) and 3 inches (75 mm) respectively. Both are designed to accommodate tape having a maximum width of 0.500 inch (12.7 mm), and to allow proper clearance flanges 50 and 52 are separated from one another by 0.512 inch +0.008−0.000 inch (13.0 mm+0.2−0.0 mm). It will be appreciated, however, that the principles of the present invention may be applied to different size reels.

Tape takeup assembly 18 comprises a reel drive assembly 58 and a reel holding assembly 60. Both are attached to a plate 57, which in turn is movably secured to face plate 10 by bolts 59 captivated in elongate equal length linear slots 61 in the faceplate. Reel drive assembly 58 includes motor 62, tachometer 64, drive shaft 66, and rear reel support 68. Motor 62 and attached tachometer 64 are mounted on the rear of plate 57 so that drive shaft 66 is substantially normal to the plane of face plate 10. Shaft 66 of motor 62 passes through aperture 65 in plate 57 and through a large rectangular aperture 67 in face plate 10. Aperture 67 is dimensioned to have a length similar to the length of a slot 61. Shaft 66 supports and supplies motive power to rear reel support 68.

Rear reel support 68 comprises collet 70, disc 72, and spindle 74. Collet 70 is dimensioned to allow a smooth, linear sliding fit between rear reel support 68 and shaft 66. Collet 70 is provided with adjustment means, such as set screw 76, to permit the axial displacement of rear reel support 68 along shaft 66. Collet 70 supports disc 72 substantially normal to the axis of shaft 66.

Disk 72 is a rigid circular plate with an overall diameter preferably similar to the diameter of the largest reel 46 to be accommodated. Disk 72 is mounted concentrically with the bore in collet 70, and is preferably provided with a pair of concentric circular ridges 78 and 80 facing away from the collet. In the preferred embodiment, the winding mechanism is configured to accept either of the two commonly used sizes of reels used in video tape cassettes, and circular ridges 78 and 80 are dimensioned to have diameters equal to or slightly smaller, e.g., on the order of ⅛ to ¼ inch (3 to 6 mm), than the diameters of these reels, e.g., outer ridge 78 preferably has an outside diameter no smaller than 3.4 inches (86 mm), while inner ridge 80 preferably has a minimum outside diameter of 2.75 inches (70 mm). Each ridge is on the order of 0.16 inch (4 mm) wide. Outer ridge 78 extends 0.09 inch (2.3 mm) outward from disk 72, while inner ridge 80 extends 0.06 inch (1.5 mm) from the disk. It will be understood, however, that differently dimensioned ridges would be employed for differently sized reels, and that the disk may be configured for a different number of reel sizes. In particular, disk 72 may be configured to accommodate only one size reel.

Disk 72 and collet 70 are provided with a central counterbore 82 coaxial with the axis of the two and penetrating through the disk into the collet.

Spindle 74 is disposed centrally on disk 72, extending from counterbore 82 in the direction opposite collet 70. Spindle 74 is rotationally symmetric and has an axis of rotation coaxial with that of collet 70. In the preferred embodiment, spindle 74 comprises a plurality of individual sections 84 of a hollow thin walled cylinder (best seen in FIG. 1) surmounting a concentric flange 86 (best seen in FIG. 2). The inside diameter of spindle 74 is chosen to accommodate drive shaft 66. Sections 84 are disposed to act as splines within recess 54 of reel 46, and are further disposed to define a cylinder slightly larger than the diameter of the recess. Each section 84 is slightly tapered at each end (i.e., near and remote from flange 86). Flange 86 is dimensioned to tightly fit within counterbore 82 of disk 72 and collet 70, whereby spindle 74 may be secured to the disk and collet, as by countersunk screws (not shown). Preferably spindle 74 is fabricated from a resiliently distortable material such as polyethylene, polypropylene, or the like.

Reel holding assembly 60 comprises pivot arm assembly 88 and front reel support 90. Pivot arm assembly 88 comprises pivot bearings 92 and 94, pivot shaft 96, and hub clamping arm 98. Pivot bearing 92 is in the form of a cylindrical post with a central bore 100. Bearing 92 is mounted, through rectangular slot 93 in face plate 10, to the front of plate 57 by bolts 95. The disposition of bearing 92 is chosen to be adjacent and clear of reel drive assembly 58, remote from splicing block assembly 12, and with the axis of bore 100 substantially normal to the plane of face plate 10. Bore 102 is provided in plate 57 coaxial with bore 100, in order that pivot shaft 96 may pass through the plate. Bearing 94 is in the form of an L-shaped structure having a bore 104 in and normal to one of its legs. As may be seen in FIG. 6, bore 104 is further provided with radially extending slots 106A and B. Slot 106B is preferably shallower than slot 106A. The angular gap between slots 106A and B is made large enough to permit the front reel support 90 to be swung clear of rear reel support 68, as will be described hereinafter. A pair of bores 108, parallel to bore 104, are provided through the other leg of the L-shaped bearing structure. Bearing 94 is mounted on the rear of plate 57, with bore 104 coaxial with and spaced apart from bore 102, by a pair of screws 110 passing through bores 108 and into tapped holes in plate 57.

Pivot shaft 96 is a rod dimensioned to slidably and rotatably fit bores 100, 102 and 104. Flange 112 is secured near one end of shaft 96, between plate 57 and bearing 94. Compression spring 114 is provided about shaft 96 between the rear of plate 57 and flange 112. Lock pin 116, extending radially from shaft 96 and dimensioned to fit slots 106 of bearing 94, is disposed between flange 112 and the nearest end of the shaft. A portion 118 of shaft 96 remote from pin 116 is threaded and provided with adjustment nut 120. Adjustment nut 120 is further provided with a set screw 122. The overall length of shaft 96 is chosen to slightly exceed the sum of (a) the overall distance between the back surface of bearing 94 and the face of face plate 10, (b) the distance between the face of face plate 10 to a front flange 50 of a reel 46 mounted on rear reel support 68, and (c) the axial extent of front reel support 90.

Hub clamping arm 98 is adjustably affixed normal to the axis of shaft 96, as by split-end shaft grip 126 and compression bolt 128 (best seen in FIG. 1), provided at one end of the arm. The other end of arm 98 is provided with bore 130. Bore 130 is substantially parallel to the axis of the split-end shaft grip 126. The axial distance between shaft grip 126 and bore 130 is chosen to be equal to the axial distance between bore 100 of bearing 92 and shaft 66 of reel drive assembly 58.

A set of bearings 132 are provided in counterbores at either end of bore 130. Bearings 132 rotatably support hollow shaft 134 which passes through arm 98 and extends toward face plate 10 therefrom. Hollow shaft 134 also extends, but only slightly, beyond arm 98 on the side of the arm distal from face plate 10. Hollow shaft 134 is provided with retaining ring 135 on the end of the shaft distal from face plate 10, ring 135 confronts the inner race of the respective bearing 132. Hollow shaft 134 is internally threaded to accept a centering screw 136. Centering screw 136 has an overall length greater than that of hollow shaft 134, and is provided with pivot socket 138, dimensioned to accept centering pin 56 of reel 46, at one end. Lock nut 140 is provided to secure centering screw 136 to hollow shaft 134, the lock nut, when tightened, binding against the end of the hollow shaft adjacent retaining ring 135.

Front reel support 90 is affixed to the extended end of hollow shaft 134 proximate face plate 10. Front reel support 90 comprises hub 142 and disk 144, of unitary construction. Hub 142 is a short, thickwalled hollow cylinder dimensioned to tightly fit over hollow shaft 134. Hub 142 and ring 135 confront the inner races of bearings 132 and coact with them to prevent axial but not rotational movement of shaft 134 relative to arm 98. Disk 144 is a rigid circular plate concentric with and normal to the axis of hollow shaft 134. The central bore of hub 142 and disk 144 accommodating hollow shaft 134 penetrates throughout front reel support 90. Hollow shaft 134 is dimensioned to rest flush with the front surface of disk 144. Disk 144 is provided with concentric ridges 146 and 148, similar to ridges 78 and 80 respectively of rear support disk 72.

Figure 6:
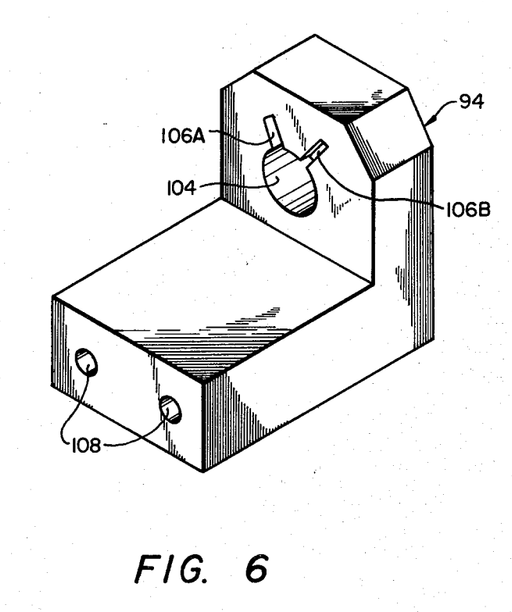
FIG. 6 is a perspective view of the pivot locating means of the mechanism of FIG. 1.

The operation of the winding mechanism will now be explained. As may be seen in FIG. 1, hub clamping arm 98 and front reel support 90 may be swung, relative to the rest of the mechanism, in an arc parallel to face plate 10, at least between a position well clear of rear reel support 68 (the reel loading position, shown solid) and a position in line with the rear reel support (the tape winding position, shown dashed). The angle between the reel loading and tape winding positions is determined by the angle between the two slots 106A and B in bearing 94 (FIG. 6). Spring 114, compressed between plate 57 and flange 10 (FIG. 2), forces pin 116 into the front surface of bearing 94, and into either slot 106 when it comes opposite the slot.

Front reel support 90 may be moved between the tape winding and the reel loading postions by manually pulling arm 98 away from face plate 10, thereby compressing spring 114 and lifting pin 116 out of either slot 106A or B. When pin 116 is clear of either slot, shaft 66 is free to rotate, and arm 98 and the attached front reel support may be swung to the alternate position, pin 116 riding on the front face of bearing 94 until it encounters the other slot 106, at which point the compressed spring 114 will force the pin into the slot, locking the arm and the front reel support in position.

The angular position about shaft 96 of arm 98 relative to pin 116 may be adjusted by loosening compression bolt 128 on split end grip 126 (FIG. 1). This adjustment is normally made when pin 116 is in the slot 106A corresponding to the tape winding position, centering screw 136 on arm 98 being made coaxial with shaft 66 of reel drive assembly.

Figure 3:
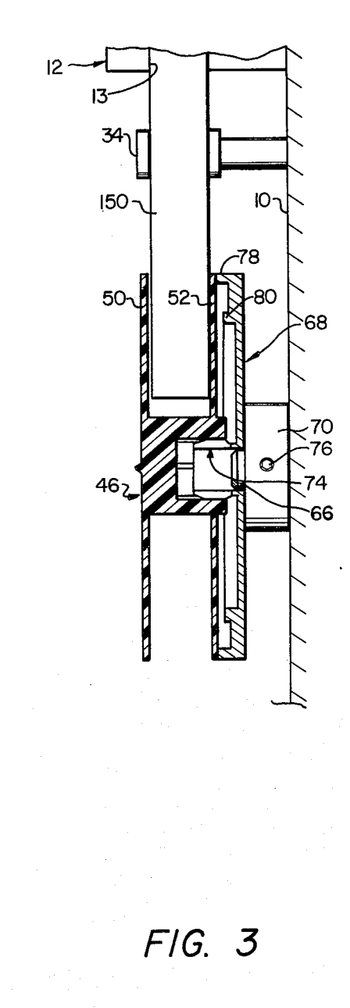
FIGS. 3–5 are fragmentary plan views of the splicing block and winding station of the mechanism of FIG. 1 showing various stages in the alignment of the guide means.
Figure 4:
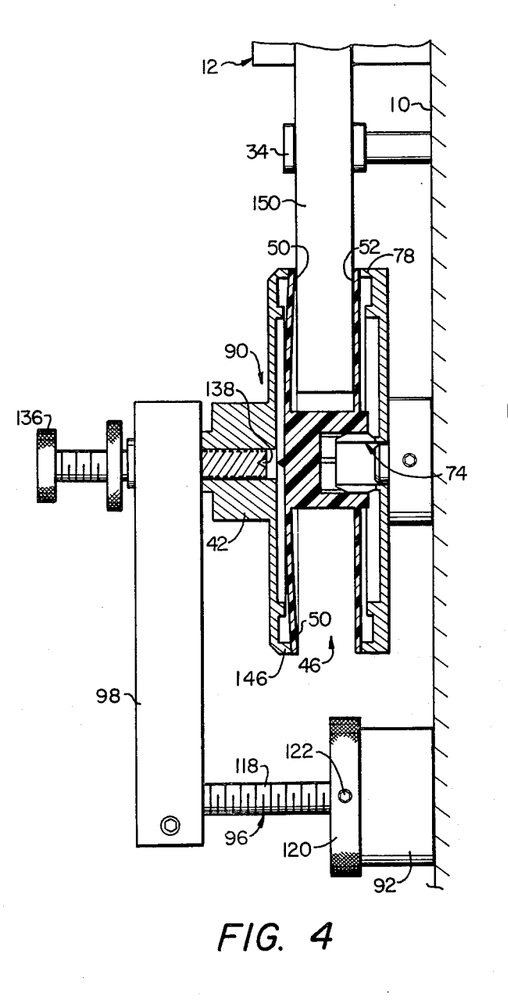
Figure 5:
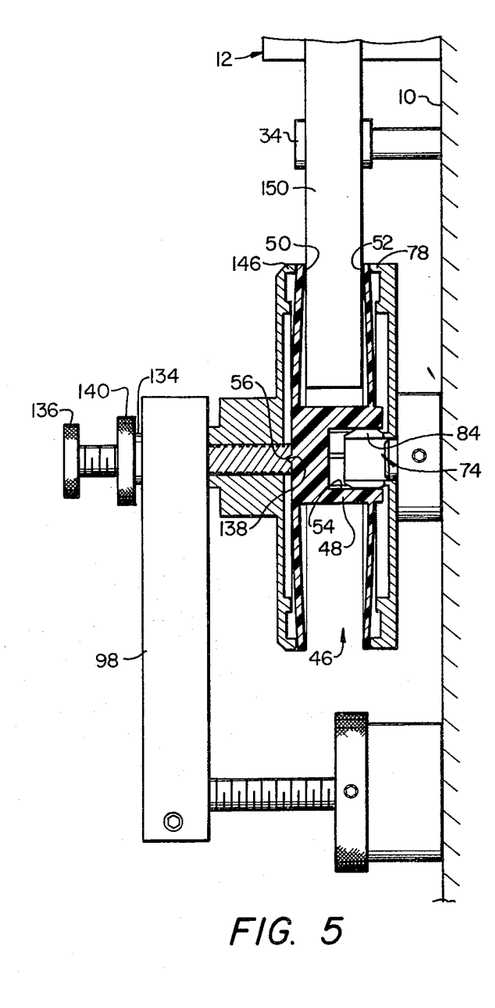

With the aid of FIGS. 3-5, the alignment of the tape guide and centering apparatus will now be described. With arm 98 and front reel support 90 in the reel loading position, an empty tape reel 46 (here shown as a large sized, 3.5 inch reel) is placed on spindle 74 of rear reel support 68, with rear flange 52 of the reel resting on outer ridge 78 (FIG. 3). It will be understood that a smaller reel 46 would be placed with its rear flange resting on inner ridge 80. A flat strap-like gauge 150, dimensioned to have a width equal to the maximum allowable tape width, in the present case, 0.500 inch (12.70 mm) is positioned in tape guide means 13 of splicing block mechanism 12, across idler roller 34, and between flanges 50 and 52 of reel 46. With gauge 150 thus aligned along the path followed by the tape 24, rear reel support 68 is axially displaced along motor shaft 66 until the inside surface of flange 52 rests flat against the edge of gauge 150 nearest face plate 10. In this position, there will be a gap between front flange 50 and gauge 150 of 0.012 to 0.020 inch (0.3 to 0.5 mm—shown exaggerated in the Figures for clarity), inasmuch as the spacing between flanges of a reel are dimensioned to be this much larger than the maximum tape width. Set screw 76 is now tightened, securing rear reel support 68 to motor shaft 66.

With centering screw 136 backed off so that pivot socket 138 is within hub 42 of front reel support 90 (FIG. 4), hub clamping arm 98 is manipulated to bring front reel support 90 to the tape winding position. In this position, front reel support 90 is opposite rear reel support 68. Spring 114, acting through flange 112 on pivot shaft 96 forces arm 98 and front reel support 90 toward face plate 10. With pin 116 aligned with a slot 106A in rear pivot bearing 94, the rearward motion of shaft 96, arm 98, and reel support 90 is controlled by contact between adjustment nut 120 and front pivot bearing 92. Adjustment nut 120 is displaced along threaded portion 118 of shaft 96 so as to permit shaft 96 to move toward face plate 10 just enough to allow outer ridge 146 to contact front flange 50 of reel 46 and deflect the periphery of that flange into light contact with gauge 150, as shown in FIG. 4. It will be recognized that, as front flange 50 is thinner and more resilient than rear flange 52, and as reel 46 is additionally supported from the rear by spindle 74, the resilient distortion of reel 46 will occur primarily in front flange 50. With front flange 50 bowed inward to contact gauge 150, and with rear flange 52 still sensibly flatly contacting the other edge of gauge 150, set screw 122 of adjustment nut 120 may now be tightened, securing the nut to shaft 96. Ridges 146 and 78 are now separated from one another by the maximum tape width plus the sum of the thickness of the reel flanges.

With the positions of rear and front reel supports 68 and 90 respectively thus established, centering screw 136 is now advanced through hollow shaft 134, until pivot socket 138 engages centering pin 56 of reel 46. Further rearward motion of centering screw 136 applies an axial force to hub 48 of the reel, and resilient inward deflection of sections 84 of spindle 74 permits recess 54 in the reel hub to move backward over the spindle, causing bowing of rear flange 52, which is still supported peripherally by ridge 78. When flange 50 and 52 are approximately equally bowed, centering screw 136 may be locked by tightening lock nut 140 against hollow shaft 134. The overall appearance of the reel and winding mechanism is then as shown in FIG. 5.

While arm 98 and front reel support 90 may be manipulated back and forth between the reel loading and the tape winding positions, contact between adjustment nut 120 and bearing 92 will insure that when arm 98 is in the dotted line position shown in FIG. 1 front reel support 90 and centering screw 136 will be at the adjusted distance from face plate 10 and from the plane of rear reel support 68. While slot 106A is deep enough to allow rearward movement of shaft 98 to be limited by engagement of nut 120 with bearing 92, it is preferred that slot 106B be shallow enough to cause front reel support 90 to be spaced further than the adjusted distance from rear reel support 68 to facilitate access to and inspection of the front reel support by an operator.

Gauge 150 may now be removed, and empty reel 46 replaced by one of a pair of reels to be loaded, the other reel of the pair being placed in reel holder 36, and leader 39 between the two reels being led over idler 34 and splicing block assembly 12. Front reel support 90 is brought into the tape winding position, whereby the cooperative action between front and rear reel supports 90 and 68 and centering screw 136 and spindle 74 distorts the peripheries of flanges 50 and 52 equally toward one another. Thereafter the machine is caused to carry out a cassette reel loading cycle. The operation of the splicing and winding mechanisms, with the exception of the tape guide and centering feature, is substantially as described in U.S. Pat. No. 4,204,898. With leader 39 cut and supply tape 24 spliced to the leader attached to the reel in tape takeup assembly 18, motor 62 is turned on, and winding proceeds. The peripheries of the pinched flanges 50 and 52 act as a tape guide as the tape is wound, delimiting the sideways excursions of the tape, the equal distortion of each flange centering the wound tape between the flanges. At the end of the winding operation, supply tape 24 is cut and the leader 39 connected to reel 38 in holder 36 is spliced to the tape wound to the other reel. At the end of the cassette reel loading cycle, arm 98 is manipulated into the reel loading position, releasing the tension on flanges 50 and 52. Flanges 50 and 52 spring back to their original parallel disposition, and the pair of reels may be removed from the apparatus.

The tape so wound is not merely guided into the reel by the distorted flanges, it is centrally guided. That is, on release of the tension on flanges 50 and 52, the tape will be found to be similarly spaced apart from both flanges. As the tape is only contacted on its edges as it enters the reel, the tension on the tape is not appreciably changed. Consequently, this method of guiding the tape does not lead to a more tightly packed reel. As neither surface of the tape is contacted by the flanges, surface damage will not occur. The changing tape tension caused by friction between the tape and the reel flanges is minimal and sensibly constant throughout the winding operation.

The entire tape takeup assembly 18 and motor 62 may be moved as a unit relative to idler wheel 34 and splicing block assembly 12, as it is all mounted on plate 57 which is adjustably captivated to slots 61 by bolts 59. Such an adjustment permits the operator to compensate for variations in the length of the leader initially connecting the two tape reels. This adjustment allows the operator to move the takeup assembly so that the leader will be substantially free of loops in its extension over the splicing block assembly, facilitating rapid loading of cassette reels. Such an adjustment also allows the the maximum wrap angle about idler wheel 34 to be selected.

Obviously, the apparatus described may be modified in various ways without departing from the principles of the present invention. Thus, as previously noted, for use with a single size reel, the reel supports need only be provided with a single annular ridge. Clearly, the spacing between the reel supports when in the tape winding position may be controlled by a number of means, such as an adjustable post attached to bearing 92, other than an adjustable nut 120 on shaft 96. Again, it is obvious that the apparatus may be modified to accommodate reels in which the hub has an axial bore throughout or no bore at all. Since these and other changes may be made in the above apparatus without departing from the scope of the invention herein involved, it is intended that all matter contained in the above description or shown in the accompanying drawings shall be interpreted in an illustrative and not a limiting sense.

What is claimed is:

1. In a machine for winding a tape having a substantially constant width onto a reel, said reel comprising a hub with an axial recess and a pair of coaxial parallel spaced-apart resiliently distortable circular flanges, each flange having a given thickness, and said machine including means for rotating said reel coaxially about said hub and means for supplying said tape along a path parallel to and between said flanges, the improvement comprising in combination:
   a rotatable spindle means dimensioned to engage said recess, said spindle further being radially resiliently compressible;
   a first rigid disk connected to and concentric with said spindle, said first disk having a concentric raised ridge with an inner diameter no greater than that of a one of said circular flanges;
   a second rigid disk having a concentric raised ridge with an inner diameter substantially the same as the ridge on said first disk;
   first means rotatably supporting said second disk;
   second means for movably mounting said first means so as to enable said second disk to be placed in coaxial relation with said first disk with said ridges confronting and spaced from one another a first predetermined distance; and
   a reel centering means rotatable with said second disk and engageable with said hub when said hub is mounted on said spindle and said first and second disks are coaxially aligned, said centering means being adjustable axially of said second disk so that it may displace said hub toward said first disk a predetermined distance.

2. The improvement according to claim 1 wherein further said first rigid disk is axially adjustable.

3. The improvement according to claim 1 or 2 wherein further said first and second predetermined distances are adjustable.

4. The improvement according to claim 1 or 2 wherein said first predetermined distance is made substantially equal to the maximum width of said tape plus the sum of the thicknesses of the pair of flanges.

5. The improvement according to claim 4 wherein when said hub is displaced toward said first disk by said hub centering means, the flanges of said reels are substantially equally bowed toward one another by the clamping force exerted by said ridges on said flanges.

6. An apparatus for use in machines for winding a tape having a substantially constant width onto a reel, said machine including means for rotating a tape winding shaft and said reel comprising a hub having first and second ends, an axial recess in the first end of said hub, first and second parallel resilient circular flanges at said first and second ends of said hub, each flange having a given thickness, and a centering pin projecting from said second end of said hub, said apparatus comprising in combination:
   a collet adapted to be mounted on said tape winding shaft;
   a first rigid disk attached to and extending radially from said collet, one side of said disk having an annular ridge disposed so as to be concentric with said tape winding shaft when said collet is mounted on said tape winding shaft, said ridge having an inner diameter close to but less than that of said first flange;
   a reel mounting spindle attached coaxially to said collet and projecting from said one side of said disk, said spindle being adapted to fit within said recess and frictionally engage said hub, said spindle further being resiliently compressible in a radial direction;
   a pivot shaft extending parallel to and spaced from said tape winding shaft;
   an arm mounted on and extending radially from said pivot shaft;
   means rotatably mounting said pivot shaft so as to permit said pivot shaft to be moved axially;
   a second rigid disk rotatably mounted on said arm so as to have an axis of rotation which is parallel to the axis of rotation of said pivot shaft and is spaced therefrom a distance equal to the corresponding distance between the tape winding shaft and the pivot shaft, said second disk having an annular ridge on one side thereof facing said one side of said first disk which has an inner diameter substantially the same as the ridge on said first disk;
   means for releasably holding said arm in a first angular position wherein said first and second disks are coaxial, said arm being movable when released to a second angular position wherein said first and second disks are spaced laterally from one another;
   means for releasably holding said pivot shaft in a first axial limit position in which said second disk is a predetermined distance from said first disk;
   a reel centering means rotatable with said second disk and engageable with said centering pin when said reel is disposed so that said hub is mounted on said spindle and said arm is in said first angular position, said centering means being adjustable axially of said second disk so that when said pivot shaft is in said first axial limit position said centering means may displace said hub toward said first disk a predetermined distance.

7. Apparatus according to claim 6 further including means biasing said pivot shaft toward said first axial limit position.

8. Apparatus according to claim 7 further including means for locking said pivot shaft in said second angular position.

9. Apparatus according to claim 8 wherein said reel centering means comprises a screw rotatably mounted to said arm and extending parallel to said pivot shaft, one end of said screw being adapted to rotatably engage said centering pin.

10. Apparatus according to claim 9 wherein when said hub is displaced toward said first disk by said hub centering means, the flanges of said reels are bowed toward one another by the clamping force exerted by said ridges on said flanges.

11. A method for winding tape on a reel so that the tape is centered on said reel, said tape having a substantially constant width and being supplied to said reel along a path between first and second guide means which guide opposite edges of the tape, and said reel comprising a hub having first and second parallel resilient circular flanges extending radially from said hub and spaced apart a distance greater than said width, said method comprising the steps of:

mounting said reel so as to be rotatable on an axis which extends transversely of said path;

engaging the outer surface of the peripheral portion of said first flange with a first support which is rotatable with said reel and is located so as to align the inner surface of said flange with said first guide means;

engaging the outer surface of the peripheral portion of said second flange with a second support which is rotatable with said reel and is adapted to uniformly distort the peripheral portion of said second flange toward said first flange by an amount sufficient to reduce the gap between the peripheral portion of said flanges to a distance substantially equal to the width of said tape;

displacing said hub along said axis in a direction leading away from said second support toward said first support so as to reduce the distortion of said second flange by approximately one half and cause said first support member to uniformly distort the peripheral portion of said first flange toward said second flange by an amount sufficient to maintain said gap substantially equal to the width of said tape;

and winding tape moving along said path onto said reel by rotating said reel on said axis while maintaining such distortion of said flanges by said supports, whereby as the tape is being wound on said hub it will be guided by the peripheral portions of said flanges so as to be centered between the undistorted portions of said first and second flanges.

12. Method according to claim 11 further including the step of disengaging said reel from said first and second supports after a selected amount of tape has been wound thereon, whereby said flanges will return to their normal undistorted condition and a gap will exist between the wound tape and each flange.

* * * * *